US010107564B2

(12) United States Patent
Mathur et al.

(10) Patent No.: US 10,107,564 B2
(45) Date of Patent: Oct. 23, 2018

(54) THERMAL ENERGY STORAGE SYSTEM COMPRISING ENCAPSULATED PHASE CHANGE MATERIAL

(71) Applicants: Terrafore Technologies, LLC, Minneapolis, MN (US); Southwest Research Institute, San Antonio, TX (US)

(72) Inventors: Anoop Kumar Mathur, Shoreview, MN (US); Rajan Babu Kasetty, Riverside, CA (US); James D. Oxley, Helotes, TX (US)

(73) Assignees: Terrafore Technologies, LLC, Minneapolis, MN (US); Southwest Research Institute, San Antonio, TX (US)

( * ) Notice: Subject to any disclaimer, the term of this patent is extended or adjusted under 35 U.S.C. 154(b) by 123 days.

(21) Appl. No.: 15/243,537

(22) Filed: Aug. 22, 2016

(65) Prior Publication Data

US 2016/0356554 A1    Dec. 8, 2016

Related U.S. Application Data

(62) Division of application No. 13/187,398, filed on Jul. 20, 2011, now abandoned.

(60) Provisional application No. 61/366,409, filed on Jul. 21, 2010.

(51) Int. Cl.
*B05D 7/00* (2006.01)
*F28D 20/02* (2006.01)
*C09K 5/06* (2006.01)
*B65B 5/06* (2006.01)

(Continued)

(52) U.S. Cl.
CPC .............. *F28D 20/023* (2013.01); *B65B 5/06* (2013.01); *B65B 29/00* (2013.01); *B65B 51/00* (2013.01); *C09K 5/063* (2013.01); *F28D 20/028* (2013.01); *Y02E 60/145* (2013.01)

(58) Field of Classification Search
USPC ........................................................ 427/212
See application file for complete search history.

(56) References Cited

U.S. PATENT DOCUMENTS 4,505,953 A * 3/1985 Chen ...................... C09K 5/063
264/7
5,007,478 A * 4/1991 Sengupta .............. F28D 20/023
165/10

(Continued)

*Primary Examiner* — Tabatha L Penny
(74) *Attorney, Agent, or Firm* — Grossman, Tucker, Perreault & Pfleger, PLLC (57) ABSTRACT

Methods of encapsulating a phase change material in a capsule including suspending a particle of the phase change material in an air stream, coating an entire surface of the suspended particle with at least one layer of a sacrificial compound, coating an entire surface of the layer of the sacrificial compound with at least one layer of a second material, and encapsulating the phase change material within a shell formed by the second material. The step of encapsulating comprising heating the particle coated with the sacrificial compound and the second material, thermally decomposing the sacrificial compound, and vaporizing the sacrificial, wherein the sacrificial compound has a decomposition temperature less than a phase change temperature of the phase change material and a phase change temperature of the second material.

27 Claims, 5 Drawing Sheets

(51) Int. Cl.
  *B65B 29/00* (2006.01)
  *B65B 51/00* (2006.01)

(56) References Cited

U.S. PATENT DOCUMENTS

2007/0145326 A1* 6/2007 Joseph ................ A61K 8/0208
                                                           252/70
2008/0135245 A1* 6/2008 Smith .................... C04B 35/04
                                                          166/280.2

* cited by examiner

THERMAL ENERGY STORAGE SYSTEM COMPRISING ENCAPSULATED PHASE CHANGE MATERIAL

CROSS-REFERENCE TO RELATED APPLICATIONS

This application is a divisional application of U.S. application Ser. No. 13/187,398, filed Jul. 20, 2011, now abandoned, which claims the benefit of the filing date of U.S. Provisional Patent Application Ser. No. 61/366,409 filed Jul. 21, 2010 which, in their entirety, the teachings of which are hereby incorporated herein by reference.

GOVERNMENT RIGHTS CLAUSE

This invention was made with United States Government support under Contract No. DE-EE0003589 awarded by the U.S. Department of Energy. The government has certain rights in the invention.

TECHNICAL FIELD

The present invention relates to an apparatus for storing and retrieving thermal energy. In particular, the invention pertains to an apparatus for storing and retrieving thermal energy from an encapsulated phase change material. Methods for encapsulating said phase change material in a capsule are also provided.

BACKGROUND

Thermal energy storage systems incorporating phase change material are well known in the art. Such systems generally include a tank containing the phase change material. Thermal energy, when added to the phase change material, causes the phase change material to absorb at least some thermal energy in an amount equal to its heat of fusion and accordingly change phase from solid to liquid. Thermal energy, when removed from the phase change material, causes the phase change material to release its heat of fusion and accordingly change phase from liquid to solid.

In prior art thermal energy storage systems, generally one or more heat exchangers submerged within the phase change material are used for adding and/or removing the thermal energy. As is well known in the art, removal of thermal energy from the phase change material causes the phase change material to solidify on the heat exchanger surfaces and consequentially deteriorates the heat exchanger effectiveness.

Accordingly, there exists a need for a thermal energy storage system wherein the phase change material does not solidify on one or more heat exchangers as the phase change material releases its heat of fusion in the form of thermal energy extracted from the thermal energy storage system.

SUMMARY

An embodiment of the invention comprises an apparatus for storing and retrieving thermal energy from a phase change material encapsulated in a capsule. A plurality of such capsules are submerged in a heat transfer fluid contained within a tank. The heat transfer fluid functions as a medium for transferring thermal energy to and/or from the encapsulated phase change material. Thermal energy added to the heat transfer fluid by an external means is transferred to the phase change material within the capsules causing the phase change material to change from solid to liquid. The phase change material releases thermal energy in the process of changing from liquid to solid. The released thermal energy is added to the heat transfer fluid and transported to an external means.

The apparatus, in accordance with an embodiment of the invention, comprises a control module configured for optimizing a thermocline within the heat transfer fluid in the tank. In one such embodiment, thermocline optimization is accomplished by changing one or more of the location along a height of the tank from whereat the heat transfer fluid is extracted, the location along a height of the tank whereat the heat transfer fluid is returned to the tank, and a flow rate of the heat transfer fluid extracted from and/or returned to the tank.

Methods are provided for encapsulating a phase change material within a capsule or a shell impervious to both the phase change material contain therewithin and the heat transfer fluid within which the capsule or shell is submerged.

In accordance with an embodiment of the invention, a particle of the phase change material is suspended in an air stream and exposed to an atomized solution of a first material. Upon drying, a coating, comprising one or more layers, of the first material is formed around the particle of the phase change material. Another coating, comprising one or more layers, of a second material is then applied around the first material encasing the phase change material. The encapsulated phase change material is then heated to a temperature sufficiently high to vaporize or thermally decompose the first material encasing the phase change material. In an embodiment of the invention, the first material is an organic polymer having a decomposition temperature less than a phase change temperature of both the phase change material and the second material. Vaporization of the first material results in a void within the capsule or shell formed by the second material within which the phase change material is encased. The void within the capsule or shell is of sufficient size to accommodate any change in the volume of the phase change material when it changes from solid to liquid.

In accordance with another embodiment of the invention, a particle of the phase change material is suspended in an air stream and exposed to a solution of a mixture comprising a binder and metal particles. Upon drying, a coating, comprising one or more layers, of the mixture is formed around the particle of the phase change material. The encapsulated phase change material is then heated to a temperature sufficiently high to both vaporize or thermally decompose the binder and sinter the metal particles. As such, the sintered metal particles form the capsule or shell encasing the phase change material therewithin. In an embodiment of the invention, the binder is an organic.

DETAILED DESCRIPTION

While multiple embodiments of the instant invention are disclosed, alternate embodiments may become apparent to those skilled in the art. The following detailed description describes only illustrative embodiments of the invention with reference to the accompanying drawings wherein like elements are designated by like numerals. It should be clearly understood that there is no intent, implied or otherwise, to limit the invention in any form or manner to that described herein. As such, all alternatives are considered as falling within the spirit, scope and intent of the instant invention.

Figure 1:
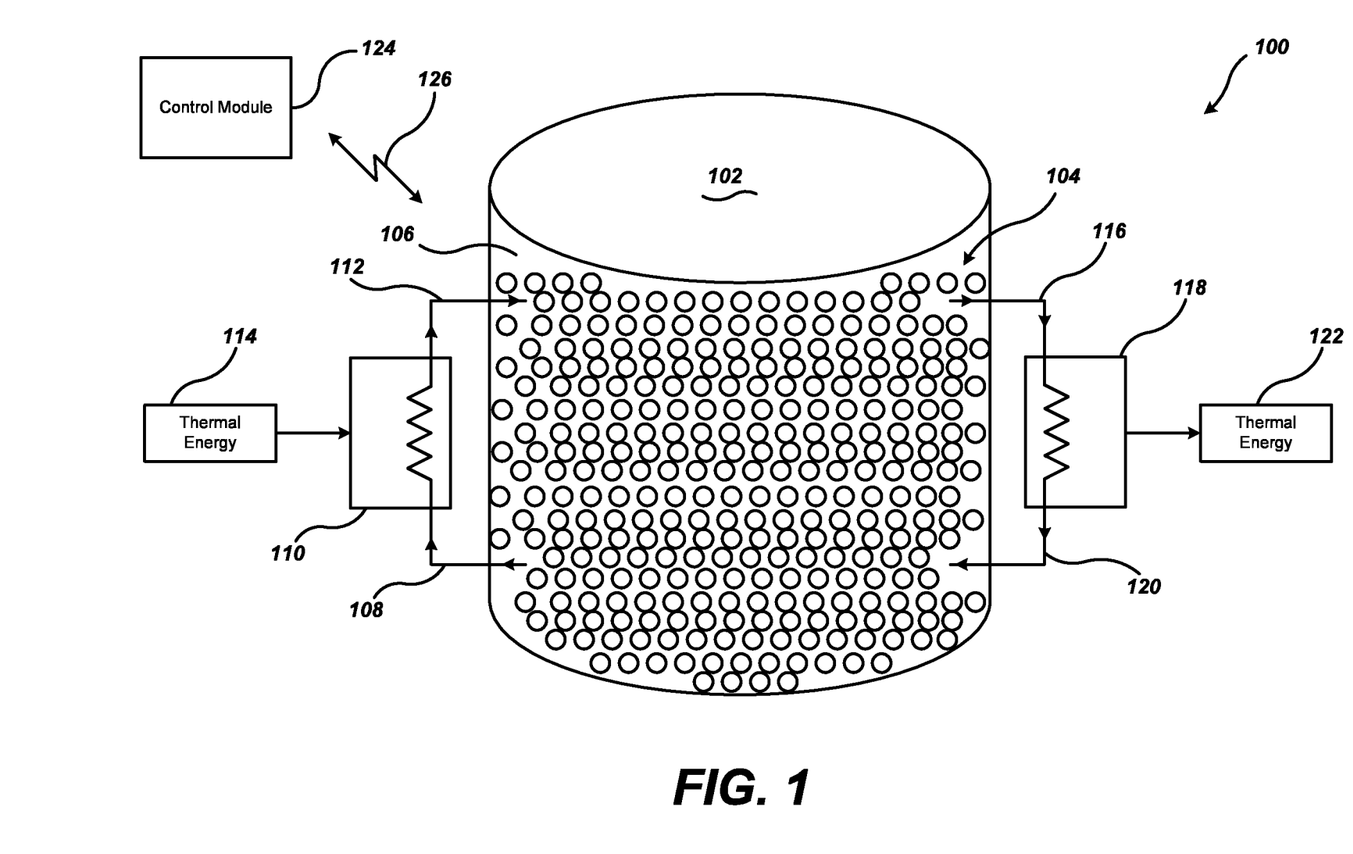
FIG. 1 is a schematic of a thermal energy storage system in accordance with an embodiment of the invention.

FIG. 1 is a schematic of thermal energy storage system 100 in accordance with an embodiment of the invention. Thermal energy storage system 100 comprise storage tank 102 containing a plurality of capsules 104 submerged in heat transfer fluid 106. Each one of the plurality of capsules 104 contains a phase change material encapsulated therewithin as described in detail herein below. Thermal energy is added to (or stored in) tank 102 by extracting a portion of heat transfer fluid 106 from tank 102, adding thermal energy to the extracted heat transfer fluid 106, and thereafter returning the heated heat transfer fluid 106 back to tank 102. As illustrated, heat transfer fluid 106 is extracted from tank 102 along flow path 108, heated in first heat exchanger 110, and thereafter returned to tank 102 along flow path 112. Heat transfer fluid 106 flowing through first heat exchanger 110 is heated by thermal energy 114 from an external source. In an embodiment of the invention, thermal energy 114 is supplied by a solar tower, a solar receiver, etc. Thermal energy is extracted (or removed) from tank 102 by extracting a portion of heat transfer fluid 106 from tank 102, removing the thermal energy from the extracted heat transfer fluid 106, and thereafter returning the cooled heat transfer fluid 106 back to tank 102. As illustrated, heat transfer fluid 106 is extracted from tank 102 along flow path 116, cooled in second heat exchanger 118, and thereafter returned to tank 102 along flow path 120. Heat transfer fluid 106 flowing through second heat exchanger 118 transfers thermal energy 122 to an external source. In an embodiment of the invention, thermal energy 122 is supplied to a steam generator for the purposes of operating one or more steam turbines in an electrical power plant.

Within tank 102, thermal energy is stored in the form of sensible and latent heat. In accordance with an embodiment of the invention, thermal energy within tank 102 is stored in a phase change material encapsulated in each one of the plurality of capsules 104. The heated heat transfer fluid 106 entering tank 102 along flow path 112 transfers at least a portion of its thermal energy to one or more of the plurality of capsules 104. The thermal energy transferred to capsules 104 heats the phase change material contained therewithin, and causes the phase change material to change from a solid to liquid. As such, the thermal energy is stored in the form of latent heat (also called the latent heat of fusion). Heating the phase change material while in the solid and/or the liquid phase causes thermal energy to be stored therewithin in the form of sensible heat. Thermal energy stored within the phase change material is extracted by cooling the one or more of the plurality of capsules 104. Cooling capsules 104 causes a transfer of at least a portion of thermal energy from the phase change material contained therewithin to the cooled heat transfer fluid 106 entering tank 102 along flow path 120. This extraction of thermal energy from the phase change material causes the phase change material to change from a liquid to solid. As such, the thermal energy is extracted in the form of latent heat (also called the latent heat of fusion). Cooling the phase change material while in the solid and/or the liquid phase causes thermal energy to be extracted from therewithin in the form of sensible heat.

In an embodiment of the invention, heat transfer fluid 106 within tank 102 is of sufficient quantity to at least fully submerge the plurality of capsules 104. Accordingly, substantially all the voids between adjacent capsules 104 are substantially filled with heat transfer fluid 106.

As also shown in FIG. 1, thermal energy storage system 100 further comprises control module 124. Control module 124, via communications link 126, controls the operation and optimization of thermal energy storage system 100 and components thereof such as, and not limited to, pumps, valves, sensors, etc. In accordance with an embodiment of the invention, control module 124 optimizes the heating of heat transfer fluid 106 in first heat exchanger 110. In accordance with another embodiment of the invention, control module 124 optimizes the cooling of heat transfer fluid 106 in second heat exchanger 118. Embodiments for optimizing the heating and cooling of heat transfer fluid 106 include, and are not limited to, varying the flow rates of heat transfer fluid 106 through first and second heat exchangers 110 and 118, respectively, changing the locations along a height of tank 102 from whereat heat transfer fluid 106 is extracted from tank 102, etc. Control module 124, in alternate embodiments of the invention, further optimizes a thermocline within heat transfer fluid 106 in tank 102. Embodiments for optimizing the thermocline include, and are not limited to, changing the locations along a height of tank 102 from whereat heat transfer fluid 106 is extracted from tank 102, changing the locations along a height of tank 102 whereat heat transfer fluid 106 is returned to tank 102, varying the flow rates of heat transfer fluid 106 through first and second heat exchangers 110 and 118, respectively, etc. All variations and alternative means for optimizing the heating and cooling of heat transfer fluid 106 and/or for optimizing the thermocline within heat transfer fluid 106 in tank 102 are considered as being within the spirit, scope and intent of the present invention.

Figure 2:
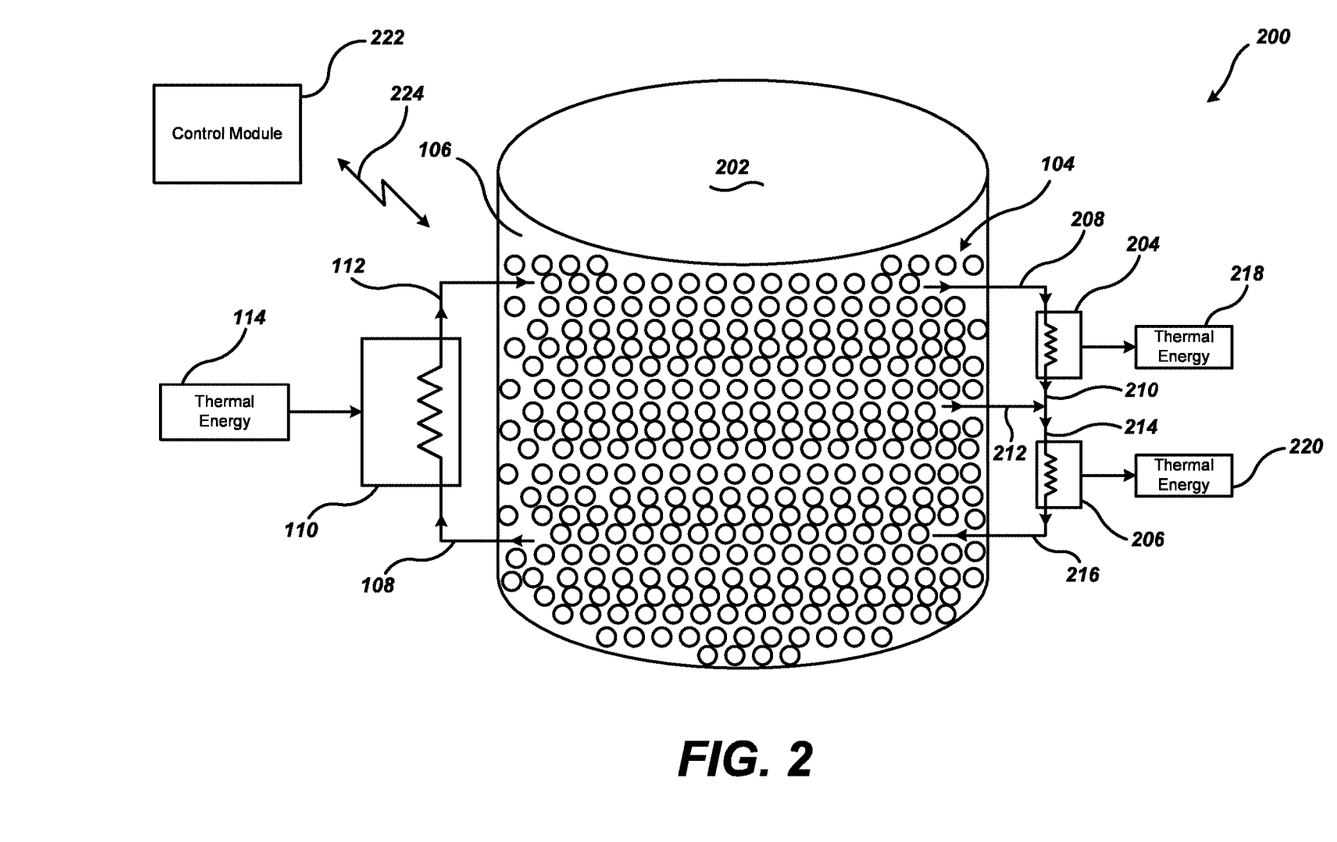
FIG. 2 is a schematic of a thermal energy storage system in accordance with another embodiment of the invention.

FIG. 2 is a schematic of thermal energy storage system 200 in accordance with another embodiment of the invention. As will be apparent to one skilled in the art, thermal energy storage systems 100 and 200 are similar in several aspects. Accordingly, like elements are depicted with like numerals, and only the differences between thermal energy storage systems 100 and 200 are described herein below with reference to FIG. 2.

Thermal energy storage system 200 comprise storage tank 202 containing a plurality of capsules 104 submerged in heat transfer fluid 106. Thermal energy is extracted (or removed) from tank 202 by extracting portions of heat transfer fluid 106 from a plurality of locations along a height of tank 202, removing the thermal energy from the extracted heat transfer fluid 106, and thereafter returning the cooled heat transfer fluid 106 back to tank 202. As illustrated, third and fourth heat exchanger 204 and 206, respectively, cool heat transfer fluid 106 extracted from tank 202. A first stream of heat transfer fluid 106 is extracted from tank 202 along flow path 208 and cooled in third heat exchanger 204. The cooled first stream of heat transfer fluid 106 exiting third heat exchanger 204 is mixed with a second stream of heat transfer fluid 106 extracted from tank 202 and the stream of mixed heat transfer fluid is cooled in fourth heat exchanger 206. The cooled stream of mixed fluid exiting fourth heat exchanger 206 is thereafter returned to tank 202 along flow path 216. The first stream of heat transfer fluid 106 flowing through third heat exchanger 204 transfers thermal energy 218 to an external source, and the stream of mixed fluid flowing through fourth heat exchanger 206 transfers thermal energy 220 to the same and/or to a different external source. In an embodiment of the invention, thermal energy 220 is supplied to a steam generator and thermal energy 218 is supplied to a superheater for superheating the steam generated in the steam generator. The superheated steam, in an embodiment of the invention, operates one or more steam turbines in an electrical power plant.

Within tank 202, the process of storing and extracting thermal energy is substantially the same as that described herein above with reference to FIG. 1.

As also shown in FIG. 2, thermal energy storage system 200 further comprises control module 222. Control module 222, via communications link 224, controls the operation and optimization of thermal energy storage system 200 and components thereof such as, and not limited to, pumps, valves, sensors, etc. In several aspects, embodiments of control module 222 are similar, substantially similar, and/or the same as the embodiments of control module 124 as described herein above with reference to FIG. 1.

In an embodiment of the invention, the plurality of capsules 104 within some sections (or portions) of tanks 102 and 202 contain phase change materials having different phase change temperatures. For example, a section near a top of tanks 102 and 202 includes a layer of the plurality of capsules 104 that encapsulate a phase change material with a phase change temperature greater than a phase change temperature of a phase change material encapsulated in the plurality of capsules 104 in a layer near a bottom section of tanks 102 and 202. In other words, the encapsulated phase change material in a section near the top of tanks 102 and 202 is different from the encapsulated phase change material in a section near the bottom of tanks 102 and 202. In alternate embodiments of the invention, tanks 102 and 202 comprise several different types of encapsulated phase change material between the top and the bottom of tanks 102 and 202, wherein the encapsulated phase change material have different phase change temperatures.

In accordance with an embodiment of the invention, control module 222 optimizes the cooling of heat transfer fluid 106 in third and fourth heat exchangers 204 and 206, respectively. Embodiments for optimizing the heating and cooling of heat transfer fluid 106 include, and are not limited to, varying the flow rates of heat transfer fluid 106 through first, third and fourth heat exchangers 110, 204 and 206, respectively, changing the locations along a height of tank 202 from whereat heat transfer fluid 106 is extracted from tank 202, etc. Control module 222, in alternate embodiments of the invention, further optimizes a thermocline within heat transfer fluid 106 in tank 202. Embodiments for optimizing the thermocline include, and are not limited to, changing the locations along a height of tank 202 from whereat the first and second streams of heat transfer fluid 106 are extracted from tank 202, changing the locations along a height of tank 202 whereat heat transfer fluid 106 is returned to tank 202, varying the flow rates of heat transfer fluid 106 through first, third and fourth heat exchangers 110, 204 and 206, respectively, varying the flow rate of the second stream of heat transfer fluid 106, etc. All variations and alternative means for optimizing the heating and cooling of heat transfer fluid 106 and/or for optimizing the thermocline within heat transfer fluid 106 in tank 202 are considered as being within the spirit, scope and intent of the present invention.

In accordance with an embodiment of the invention, each one of the plurality of capsules 104 comprises an outer shell with a hollow interior, wherein the hollow interior is at least partially filled with a phase change material. Accordingly, the hollow interior of the outer shell also includes a void of sufficient size to accommodate any change in the volume of the phase change material as it changes between the solid and the liquid phases. The methods, in accordance with the embodiments of the invention, for creating capsules 104 are described in detail herein below with reference to FIGS. 3A-4B.

Figure 3A:
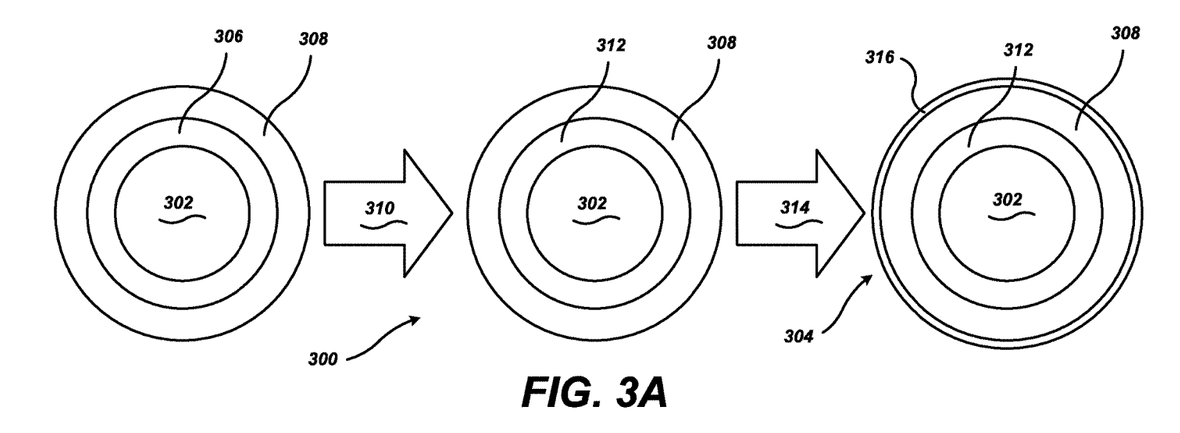
FIG. 3A illustrates a process for encapsulating a phase change material in accordance with an embodiment of the invention.

FIG. 3A is a schematic representation of process 300 for encapsulating particle 302 of the phase change material within capsule 304 in accordance with an embodiment of the invention. Capsule 304 is one of the plurality of capsules 104. Process 300 is described in further detail herein below with reference to FIG. 3B.

As illustrated in FIG. 3A, an entire surface of particle 302 of the phase change material is first coated with at least one layer of first material 306. Next, an entire surface of the layer(s) of first material 306 is coated with at least one layer of second material 308. Particle 302 coated with first and second material 306 and 308, respectively, is then placed in environment 310 wherein it is heated to a temperature greater than a decomposition temperature of first material 306. Accordingly, first material 306 decomposes and vaporizes. The decomposed and vaporized first material 306 outgases through the surrounding layer(s) of second material 308. Decomposition and vaporization of first material 306 results in void 312 within the outer shell formed by second material 308. As can be seen, particle 302 of the phase change material is encased within the outer shell formed by second material 308. Next, the outer shell of second material 308 containing therewithin particle 302 of the phase change material and void 312 is placed in environment 314 wherein an entire surface of the outer shell of second material 308 is coated with at least one layer of third material 316, thereby yielding capsule 304. Capsule 304 is one of the plurality of capsules 104 submerged within heat transfer fluid 106 in tanks 102 and 202 of thermal energy storage systems 100 and 200.

Figure 3B:
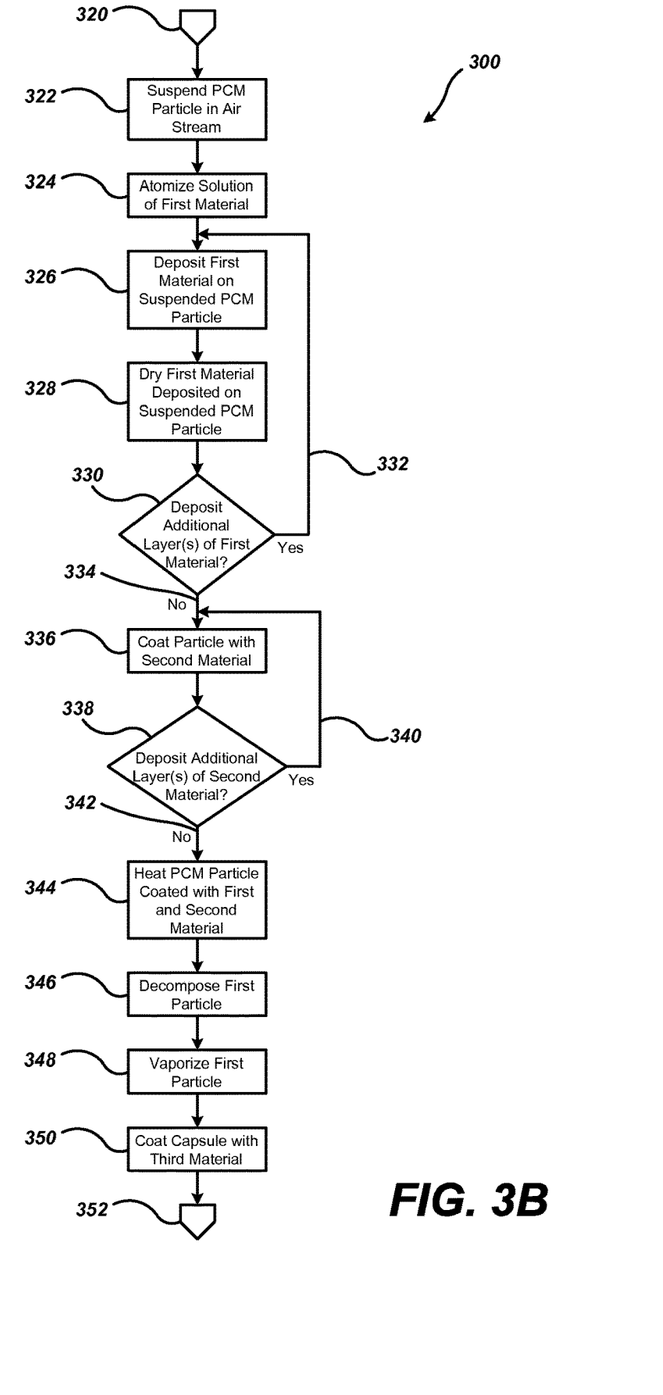
FIG. 3B is a flowchart for the process shown in FIG. 3A.

FIG. 3B is a flowchart of process 300 for encapsulating particle 302 of the phase change material in capsule 304. In accordance with an embodiment of the invention, process 300 starts at block 320. At block 322, particle 302 of the phase change material is suspending in an air stream or on an air bed. A solution of first material 306 is atomized at block 324 and particle 302 of the phase change material suspended at bock 322 is exposed to the atomized solution of first material 306. At block 326, an entire surface of particle 302 of the phase change material is coated with at least one layer of first material 306 which is then dried at block 328. At block 330, a determination is made whether or not additional layer(s) of first material 306 should be applied. If additional layer(s) of first material 306 are required (or desired), process 300 proceeds along path 332 and repeats with block 326. If additional layer(s) of first material 306 are not required (or desired), process 300 proceeds along path 334 to block 336, whereat at least one layer of second material 308 is applied to an entire surface of particle 302 of the phase change material coated with one or more layers of first material 306. At block 338, a determination is made whether or not additional layer(s) of second material 308 should be applied. If additional layer(s) of second material 308 are required (or desired), process 300 proceeds along path 340 and repeats with block 336. If additional layer(s) of second material 308 are not required (or desired), process 300 proceeds along path 342 to block 344. At block 344, particle 302 of the phase change material coated with layers of first and second material 306 and 308, respectively, is heated to a temperature greater than the decomposition temperature of first material 306, as shown at block 346, for decomposing first material 306. Decomposition and vaporization of first material 306 at blocks 346 and 348, respectively, creates a void within the layer(s) of second material 308 applied at block 336. The vapors of first material 306 produced by the decomposition and vaporization steps at blocks 346 and 348, respectively, escape through a surface of the outer shell comprising second material 308. In an embodiment of the invention, second material 308 is of sufficient porosity so as to not hinder the vapors of first material 306 from outgasing through the one or more layers of second material 308 forming the outer shell. Next, at block 350, an entire outer surface of the shell formed by the one or more layers of second material 308 is coated with at least one layer of third material 316 so as to render capsule 304 impervious to both heat transfer fluid 106 within which it will be submerged and the phase change material encased therewithin. Each one of the so formed capsule 304, which is one of the plurality of capsules 104, comprises second material 308 as its outer shell and, as such, encases (or encapsulates) particle 302 of the phase change material. Process 300 thereafter repeats with block 322 or stops at block 352.

In accordance with an embodiment of the invention, third material 316 substantially fills a substantial number of defects in the outer shell comprising second material 308. Such defects include cracks, crevices, holes, voids, etc. in the outer shell. Accordingly, third material 316 renders capsule 304 impervious to both heat transfer fluid 106 within which it is submerged and the phase change material encapsulated therewithin. In an alternate embodiment of the invention second and third material 308 and 316 are the same material.

Figure 4A:
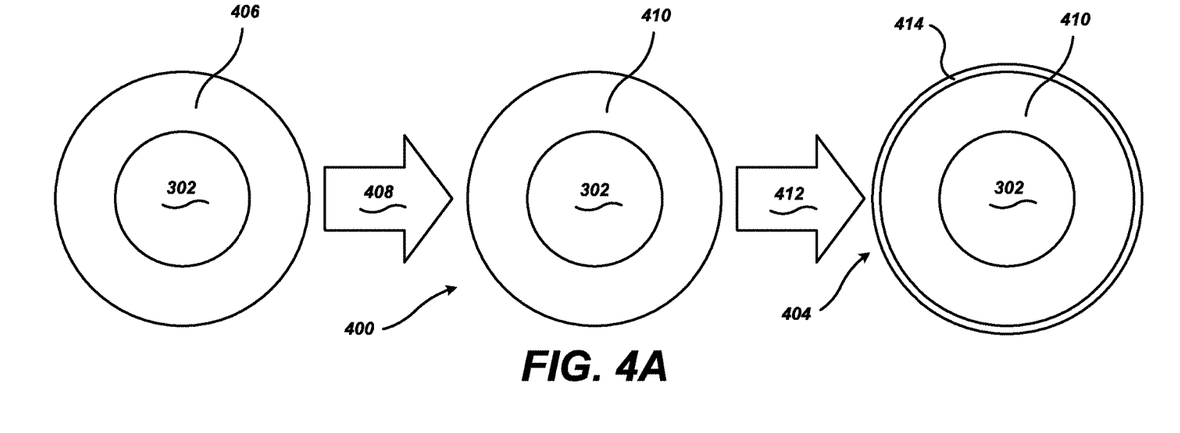
FIG. 4A illustrates a process for encapsulating a phase change material in accordance with another embodiment of the invention.

FIG. 4A is a schematic representation of process 400 for encapsulating particle 302 of the phase change material within capsule 404 in accordance with an embodiment of the invention. Capsule 404, like capsule 304, is one of the plurality of capsules 104. Process 400 is described in further detail herein below with reference to FIG. 4B.

As illustrated in FIG. 4A, an entire surface of particle 302 of the phase change material is first coated with at least one layer of mixture 406 comprising metal particles and a binder. Next, particle 302 coated with mixture 406 is then placed in environment 408 wherein it is heated to a temperature greater than a decomposition temperature of the binder within mixture 406. The binder within mixture 406 is thus decomposed and vaporized and the metal particles within mixture 406 are sintered. The sintered metal particles form shell 410 around particle 302 of the phase change material. Next, shell 410 containing therewithin particle 302 of the phase change material is placed in environment 412 wherein an entire surface of shell 410 is coated with at least one layer of material 414, thereby yielding capsule 404. In accordance with an embodiment of the invention, material 414 substantially fills a substantial number of defects in shell 410. Such defects include cracks, crevices, holes, voids, etc. in shell 410. Capsule 404, like capsule 304, is one of the plurality of capsules 104 submerged within heat transfer fluid 106 in tanks 102 and 202 of thermal energy storage systems 100 and 200.

Figure 4B:
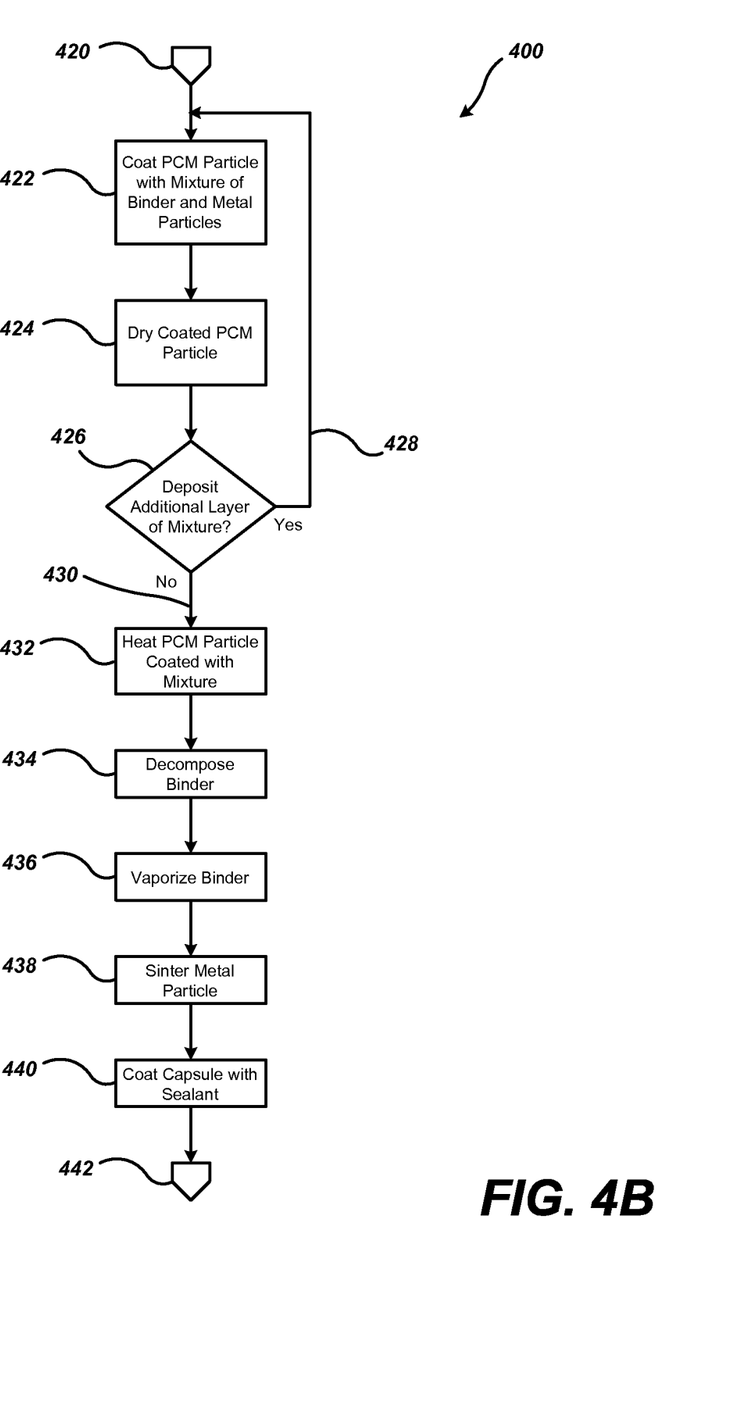
FIG. 4B is a flowchart for the process shown in FIG. 4A.

FIG. 4B is a flowchart of process 400 for encapsulating particle 302 of the phase change material in capsule 404. In accordance with an embodiment of the invention, process 400 starts at block 420. At block 422, particle 302 of the phase change material is coated with mixture 406 comprising metal particles and a binder. Mixture 406 coated on particle 302 of the phase change material is then dried at block 424. Next, at block 426, a determination is made whether or not additional layer(s) of mixture 406 should be applied. If additional layer(s) of mixture 406 are required (or desired), process 400 proceeds along path 428 and repeats with block 422. If additional layer(s) of mixture 406 are not required (or desired), process 400 proceeds along path 430 to block 432. At block 432, particle 302 of the phase change material coated with layer(s) of mixture 406 is heated for the purpose of both decomposing the binder within mixture 406 and sintering the metal particles within mixture 406. The binder within mixture 406 is decomposed and vaporized at blocks 434 and 436, respectively. Furthermore, at block 438, the metal particles within mixture 406 are sintered into forming shell 410 encasing (or encapsulating) particle 302 of the phase change material. Next, at block 440, an entire outer surface of shell 410 formed by the sintered metal particles is coated with at least one layer of material 414 so as to render capsule 404 impervious to both heat transfer fluid 106 within which it will be submerged and the phase change material encased therewithin. Each one of the so formed capsule 404, which is one of the plurality of capsules 104, comprises particle 302 of the phase change material encapsulated within a shell of sintered metal particles.

In accordance with an embodiment of the invention, material 414 substantially fills a substantial number of defects in shell 410. Such defects include cracks, crevices, holes, voids, etc. in the outer shell. Accordingly, material 414 renders capsule 404 impervious to both heat transfer fluid 106 within which it is submerged and the phase change material encapsulated therewithin.

In an embodiment of the invention, shell 410 is of sufficient elasticity to accommodate any change in the volume of the phase change material as it changes between the solid and the liquid phases. In another embodiment of the invention the encapsulated phase change material comprises a material having a phase change temperature less than a phase change temperature of the metal forming shell 410.

In an embodiment of the invention capsule 304 encapsulates a phase change material having a phase change temperature less than a phase change temperature of second and third material 308 and 316, respectively. In another embodiment of the invention capsule 404 encapsulates a phase change material having a phase change temperature less than a phase change temperature of shell 410 and material 414.

The phase change material encapsulated in capsules 304 and 404 are selected from the group consisting of sodium nitrate, potassium nitrate, mixture of sodium nitrate and potassium nitrate, inorganic salts and mixtures of salts. In accordance with an embodiment of the invention, the phase change material is selected such that the phase change temperature is approximately the same as the desired temperature for storing thermal energy as latent heat. In some applications, such as a solar tower power generating system, the encapsulated phase change material comprise a mixture of sodium nitrate and potassium nitrate having a phase change temperature approximately between 310° C. and 330° C.

As will be apparent tone skilled in the art, first material 306 is selected such that it will decompose and vaporize at a temperature less than the phase change temperatures of both the phase change material and second material 308. As such, first material 306 is essentially a "sacrificial" material aiding in the formation of void 312. In accordance with an embodiment of the invention, first material 306 is an organic polymer selected from the group consisting of hydroxypropyl methyl cellulose, carboxy-methyl cellulose, ethyl cellulose, polyethelene and poly vinyl chloride.

As will be apparent to one skilled in the art, embodiments of capsules 304 and 404 comprise an outer shell having a phase change temperature greater that the phase change temperature of the encapsulated phase change material. Accordingly, second material 308 for the outer shell of capsule 304 and the material for shell 410 are selected from the group consisting of sodium chloride, bonded metal particles, sintered metal particles, clay and mixtures of clay and metal. In an embodiment of the invention, third material 316 is the same as second material 308.

In accordance with an embodiment of the invention, the plurality of capsules 104 in tank 102 and/or 202 comprise a mixture of capsules 304 and 404.

Although not described in detail herein, alternate methods for manufacturing capsules 304 and 404 will be apparent to one skilled in the art. All such alternatives and variations are considered as within the spirit, scope and intent of the instant invention.

For example, a method in accordance with an alternate embodiment of the invention comprises first creating a particle comprising a mixture of the phase change material and a sacrificial material such as first material 306. This particle of the mixture is then coated with one or more layers of second material 308 or one or more layers of mixture 406 comprising metal particles and a binder. Next, the coated mixture of the phase change material and the sacrificial material is heated to a temperature greater than the decomposition temperature of the sacrificial material and/or the binder. Such heating will decompose and vaporize the sacrificial material and/or the binder. The vaporized sacrificial material will outgas through the surrounding layer(s) of second material 308 and thereby create an outer shell of second material 308 encasing or encapsulating therewithin the phase change material and the void. If mixture 406 is used, the particle of the mixture comprising the phase change material and the sacrificial material is heated to a temperature sufficiently high to sinter the metal particles within mixture 406. The sintered metal particles form a shell, such as shell 410, encapsulating the phase change material therewithin. As will be appreciated, the amount of sacrificial material used will be such that the void created by the decomposition and vaporization of the sacrificial material will be of sufficient size to accommodate any change in the volume of the phase change material as it changes between the solid and the liquid phases. The outer shell comprising second material 308 or shell 410 is then coated or sealed with one or more layers of third material 316 or material 414 so as to render capsules 304 and 404 impervious to both heat transfer fluid 106 within which they will be submerged and the encapsulated phase change material.

As another example, a method in accordance with another embodiment of the invention comprises a rotating disc atomization process for coating particle 302 of the phase change material with a sacrificial material, such as first material 306. According to one such process, a slurry is first formed by suspending a plurality of particle 302 of the phase change material in a solution of the sacrificial material. The slurry is then poured onto a disc rotating at high speeds. Accordingly, centrifugal forces strip or pull off the excess liquid and the plurality of particle 302 of the phase change material, now coated with a thin liquid layer of the sacrificial material, roll off the rotating disc. The sacrificial material, upon drying, creates a coating encasing particle 302 of the phase change material. Thereafter, particle 302 coated with the sacrificial material is processed in accordance with the one ore more embodiments of the methods described herein above.

In accordance with an embodiment of the invention, capsules 304 and 404 comprise a heat transfer surface area in the approximate range of 1,200 square meter per cubic meter of capsule volume to 3,000 square meter per cubic meter of capsule volume. In an embodiment of the invention, capsules 304 and 404 comprise a shape that is substantially similar to any one or more geometric shapes. In another embodiment of the invention, capsules 304 and 404 have a generally spherical shape with an outer diameter in the approximate range of 2 mm to 15 mm.

Various modifications and additions may be made to the exemplary embodiments described hereinabove without departing from the scope, intent and spirit of the instant invention. For example, while the disclosed embodiments refer to particular features, the scope of the instant invention is considered to also include embodiments having various combinations of features different from and/or in addition to those described hereinabove. Accordingly, the present invention embraces all such alternatives, modifications, and variations as within the scope, intent and spirit of the appended claims, including all equivalents thereof.

What is claimed is:

1. A method of encapsulating a phase change material in a capsule, said method comprising:
   suspending a particle of said phase change material in an air stream;
   coating an entire surface of said suspended particle with at least one layer of a sacrificial compound, said step of coating comprising
   atomizing a solution of said sacrificial compound;
   depositing at least one layer of said atomized sacrificial compound onto said surface of said suspended particle; and
   drying said layer of said sacrificial compound deposited on said suspended particle;
   coating an entire surface of said layer of said sacrificial compound with at least one layer of a second material and encapsulating said phase change material within a shell formed by said second material, said step of encapsulating comprising
   heating said particle coated with said sacrificial compound and said second material;
   thermally decomposing said sacrificial compound and vaporizing said sacrificial compound, wherein said sacrificial compound has a decomposition temperature less than a phase change temperature of said phase change material and a phase change temperature of said second material.

2. The method of claim 1, wherein said capsule is shaped substantially like a sphere having a diameter in the range of 2 mm to 15 mm.

3. The method of claim 1, wherein said step of encapsulating renders said second material impervious.

4. The method of claim 1, further comprising rendering said second material impervious by coating an entire surface of said layer of said second material with one or more layers of a third material after said step of encapsulation.

5. The method of claim 4, wherein said second material and said third material are same.

6. The method of claim 1, further comprising substantially filling a substantial number of defects in said layer of said second material by applying one or more layers of a third material after the step of encapsulating, wherein said defects include cracks, crevices, holes and voids.

7. The method of claim 6, wherein said second material and said third material are same.

8. The method of claim 1, wherein said phase change material is selected from the group consisting of sodium nitrate, potassium nitrate, mixture of sodium nitrate and potassium nitrate, and inorganic salts.

9. The method of claim 1, wherein said sacrificial compound is selected from the group consisting of an organic polymer, hydroxy-propyl methyl cellulose, carboxy-methyl cellulose, ethyl cellulose, polyethelene and poly vinyl chloride.

10. The method of claim 1, wherein said second material is selected from the group consisting of sodium chloride, bonded metal particles, sintered metal particles, clay, and mixture of clay and metal.

11. The method of claim 1, further comprising applying one or more additional layers of said sacrificial compound before coating with said second material.

12. The method of claim 11, further comprising rendering said second material impervious by coating an entire surface of said layer of said second material with one or more layers of a third material after said step of encapsulation.

13. The method of claim 11, further comprising substantially filling a substantial number of defects in said layer of said second material by applying one or more layers of a third material after the step of encapsulating, wherein said defects include cracks, crevices, holes and voids.

14. The method of claim 11, further comprising applying one or more additional layers of said second material when encapsulating.

15. The method of claim 14, wherein said step of encapsulating renders said second material impervious.

16. The method of claim 14, further comprising rendering said second material impervious by coating an entire surface of said layer of said second material with one or more layers of a third material after said step of encapsulation.

17. The method of claim 14, further comprising substantially filling a substantial number of defects in said layer of said second material by applying one or more layers of a third material after the step of encapsulating, wherein said defects include cracks, crevices, holes and voids.

18. The method of claim 1, further comprising applying one or more additional layers of said second material when encapsulating.

19. The method of claim 18, wherein said step of encapsulating renders said second material impervious.

20. The method of claim 18, further comprising rendering said second material impervious by coating an entire surface of said layer of said second material with one or more layers of a third material after said step of encapsulation.

21. The method of claim 18, further comprising substantially filling a substantial number of defects in said layer of said second material by applying one or more layers of a third material after the step of encapsulating, wherein said defects include cracks, crevices, holes and voids.

22. The method of claim 1, further comprising submerging a plurality of capsules in a heat transfer fluid, wherein each one of said plurality of capsules encapsulates said phase change material; transferring at least a portion of thermal energy in said heat transfer fluid to one or more of said plurality of capsules; and subjecting at least a portion of said phase change material encapsulated in said one or more of said plurality of capsules to change from solid to liquid.

23. The method of claim 22, further comprising transferring thermal energy to said heat transfer fluid from a heat exchanger.

24. The method of claim 22, further comprising submerging a plurality of capsules in a heat transfer fluid, wherein each one of said plurality of capsules encapsulates said phase change material; subjecting at least a portion of said phase change material encapsulated in one or more of said plurality of capsules to change from liquid to solid and release thermal energy; and transferring at least a portion of said thermal energy release by said phase change material form one or more of said plurality of capsules to said heat transfer fluid.

25. The method of claim 24, further comprising transferring thermal energy to said heat transfer fluid from a first heat exchanger; and transferring thermal energy from said heat transfer fluid to a second heat exchanger.

26. The method of claim 1, further comprising submerging a plurality of capsules in a heat transfer fluid, wherein each one of said plurality of capsules encapsulates said phase change material; subjecting at least a portion of said phase change material encapsulated in one or more of said plurality of capsules to change from liquid to solid and release thermal energy; and transferring at least a portion of said thermal energy release by said phase change material form one or more of said plurality of capsules to said heat transfer fluid.

27. The method of claim 26, further comprising transferring thermal energy from said heat transfer fluid to a heat exchanger.

* * * * *